United States Patent [19]
Rahman

[11] Patent Number: 4,718,622
[45] Date of Patent: Jan. 12, 1988

[54] TRAIN FAULT MONITORING SYSTEM

[76] Inventor: Aminur Rahman, 94-35, 239 St., Floral Park, N.Y. 11001

[21] Appl. No.: 855,323

[22] Filed: Apr. 24, 1986

[51] Int. Cl.[4] .................. B61L 23/00; B61K 13/00
[52] U.S. Cl. ........................ 246/169 R; 246/167 R; 340/505; 340/512; 340/825.54
[58] Field of Search .............. 246/167 R, 169 R; 340/518, 505, 502, 503, 504, 524, 525, 512, 825.54, 825.1, 825.65, 825.62, 825.11, 825.16, 825.17, 517

[56] References Cited
U.S. PATENT DOCUMENTS

| | | | |
|---|---|---|---|
| 3,482,089 | 12/1969 | Raffel et al. | 246/167 R |
| 3,838,272 | 9/1974 | Bull | 246/169 R |
| 4,344,364 | 8/1982 | Nickles et al. | 246/167 R |
| 4,468,664 | 8/1984 | Galviz et al. | 340/505 |
| 4,487,060 | 12/1984 | Pomeroy | 246/169 R |

Primary Examiner—John W. Caldwell, Sr.
Assistant Examiner—Alvin Oberley

[57] ABSTRACT

This invention relates to a system for monitoring faults in various functions of rail road cars from the lead car or from the locomotive of a train. This system scans the train once for one identical function of every car, and the scanning is repeated for subsequent identical functions. During scanning if this system detects fault in any car or cars, it illuminates corresponding lights on the display panel in the cab, indicating the types of faults and the car numbers. This system is capable of scanning a maximum of fifteen cars for nine different functions of each car.

5 Claims, 5 Drawing Figures

TRAIN FAULT MONITORING SYSTEM

BACKGROUND OF THE INVENTION

I have been working for the rail road for over 8 years and during this period I had the opportunity to work on rail road cars such as Amfleet cars and Metroliners of Amtrak, the M.U. cars A2 and A3 of the Department of Transportation of New Jersey and the MI cars of Long Island Rail Road. Among all the above types of cars the M.U. Cars of N.J.D.O.T. have the best fault indication system. Therefore, a brief discussion on these cars may be appropriate. Each car is equipped with a fault indication panel inside at the middle of the car. During a trip if a fault occurs in the propulsion system of a car, the fault indication panel latches up in that condition. At the same time this faulty car turns on the train fault light in the cab from which the engineer comes to know that at least one car on his train has propulsion problem. This train fault light however does not give the answers to the questions such as what kind of propulsion problem and how many cars or which cars are having this problem. After a fault indication panel latches up in a car, the said panel does not register any further changes in the fault condition of the said car. When a fault occurs in the propulsion system due to motor over load or motor ground conditions, the train fault light lights up immediately. But in case of partial or total loss of propulsive power, the train fault light lights up about 60 seconds after the engineer dials for full power. That means if a train is operated at half or three quarter of its full power for indefinite period the train fault light would not light up even if some cars lose partial or total propulsive power.

In the cab there are indication lights which indicate the conditions of doors, brake release, brake applied and the like, but in case of failure in these functions, there is no way of knowing from the cab as to which car or cars are at fault. There is no indication light provided in the cab for heating and air-conditioning of the cars.

The Amfleet cars of Amtrak are equipped with hot box detectors. When a wheel bearing gets over heated, the detecting system turns on warning light in the faulty car as well as in the locomotive. From this warning light in the locomotive the engineer comes to know that at least one car on his train has hot journal condition but he has no way of knowing from the locomotive as to which car or cars have hot journals.

In accordance with the present invention, the above and other problems of the prior art are overcome and functions not available in the prior art are provided.

The main purpose of this invention is to provide the engineer with detailed informations on the fault conditions of his train on car to car basis so that he may report these faults to proper authotity over radio long before the train reaches the yard. Knowing the volume of work involved, the repairing team may be organised accordingly.

An equally important purpose is to make the trouble shooting and testing of trains faster and easier.

A third purpose is to cut down the cost of repairs and maintenance.

A final purpose is to make the running of trains more safe and efficient.

SUMMARY OF THE INVENTION

The above and other beneficial objects and advantages are attained in accordance with the present invention by providing train fault monitoring system for detecting faults in various functions of rail road cars fro the lead car or from the locomotive of a train. The said monitoring system scans the train for one identical function of the each car. During scanning for the said function if the said system detects fault in any car or cars, the said system illuminates the corresponding lights on the display panel of the cab. This system is capable of scanning a maximum number of fifteen cars for nine functions. The scanning is done from one end of the train to the other end of the train. Scanning is repeated once for each function and after scanning for the 9th. and final function, the system goes to stop mode. After remaining in stop mode for about 30 seconds the said system resets and starts automatically and resumes scanning from the beginning. This system utilizes two types of digital electronic devices one of which is called the master unit and the other is called the car unit. The master unit is installed in the lead car or in the locomotive and the car unit is installed one in each car. The function relay assembly (which is another part of this system) is installed one in each car. The function relay assembly is interfaced with the car unit and nine different electrical circuits of a car. The master unit, the car units and the function relay assemblies are connected with two trainline wires.

BRIEF DESCRIPTIONS OF THE DRAWINGS

Figure 4:
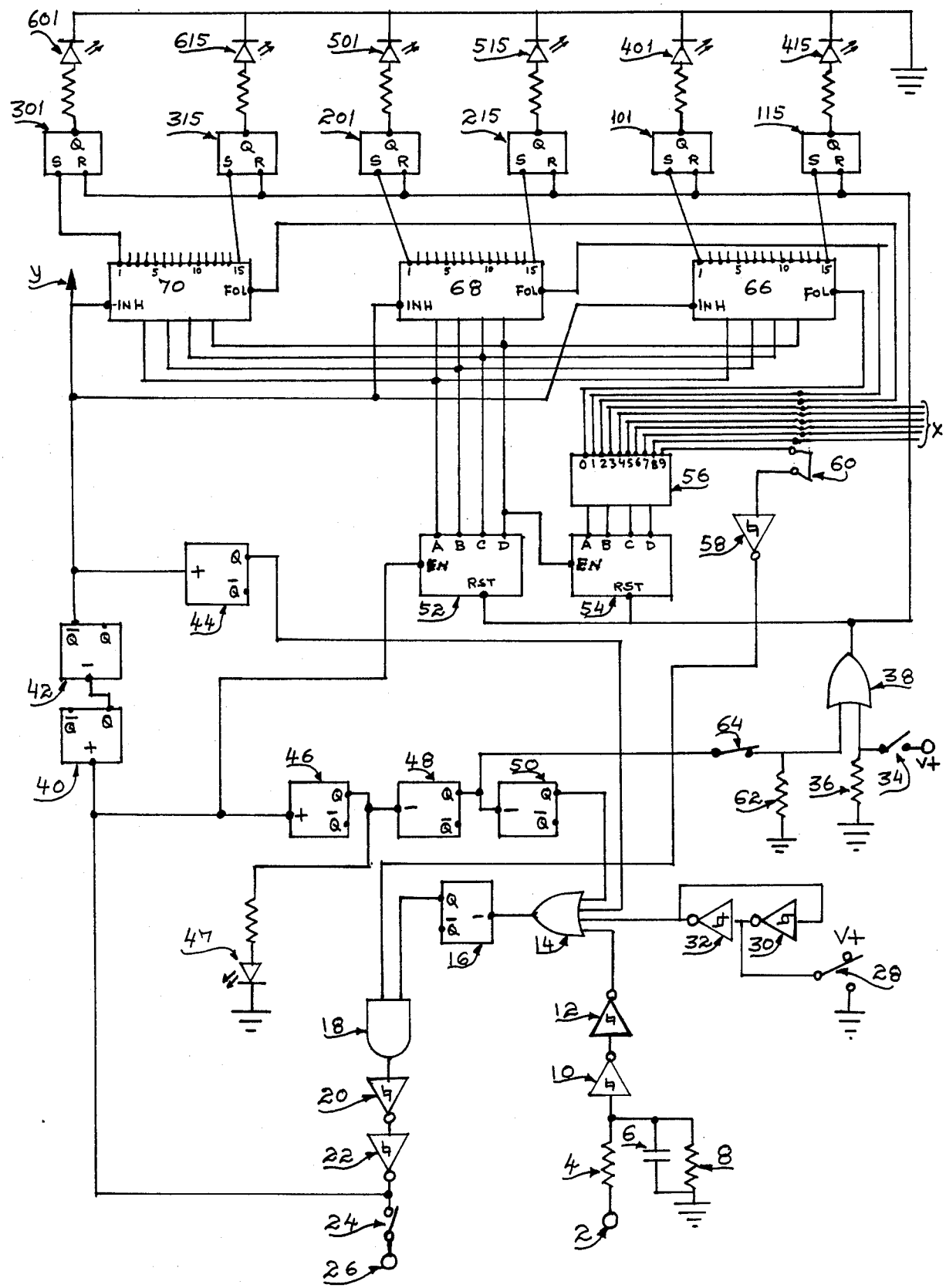

FIGS. 3(a) and (b) is a wave form diagram of the signal pulses transmitted and received by the master unit;

FIG. 4 is a schematic diagram of the master unit; and

Figure 5:
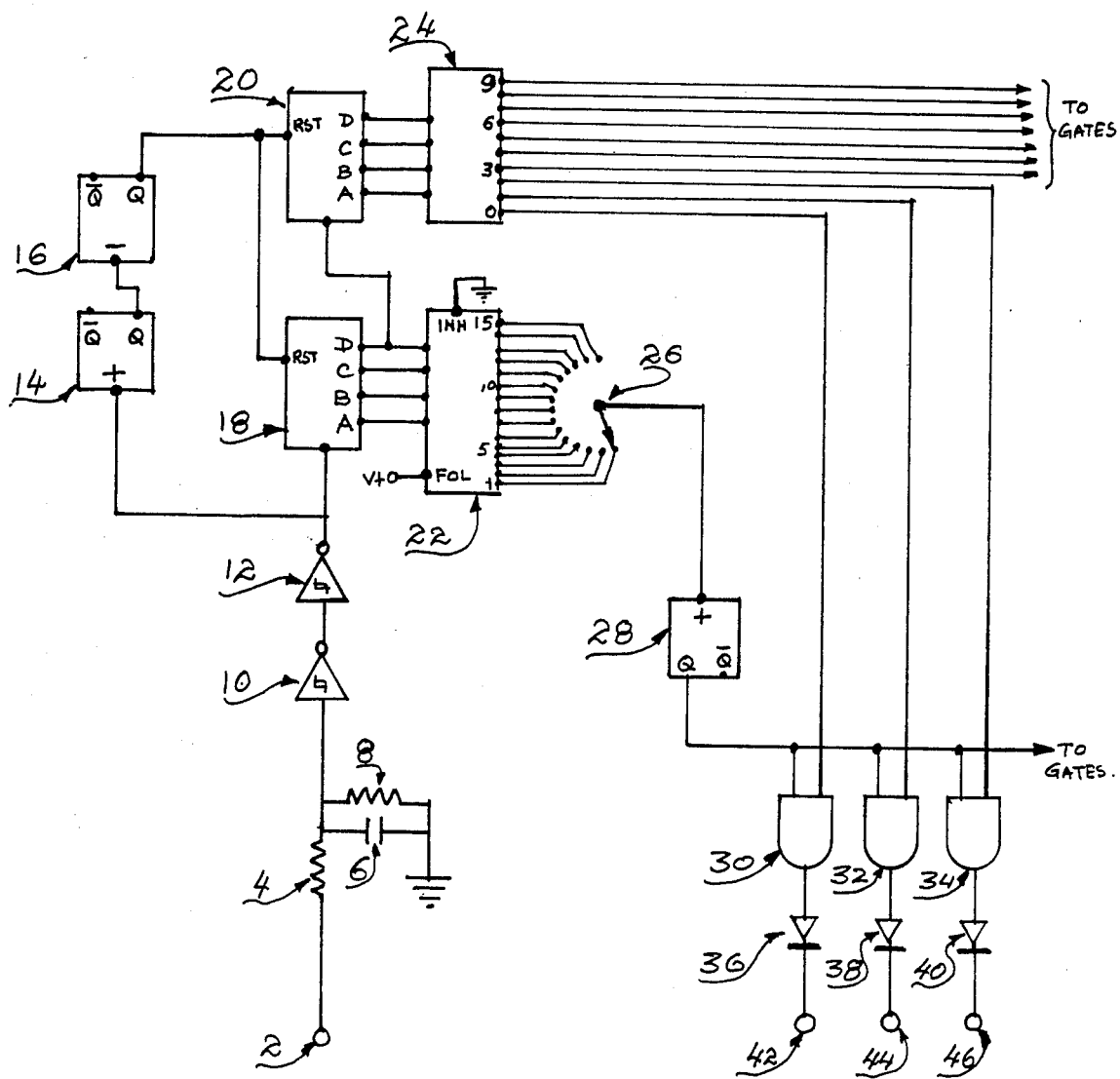

FIG. 5 is a schematic diagram of the car unit.

DETAILED DESCRIPTION OF THE PREFERRED EMBODIMENT

Figure 1:
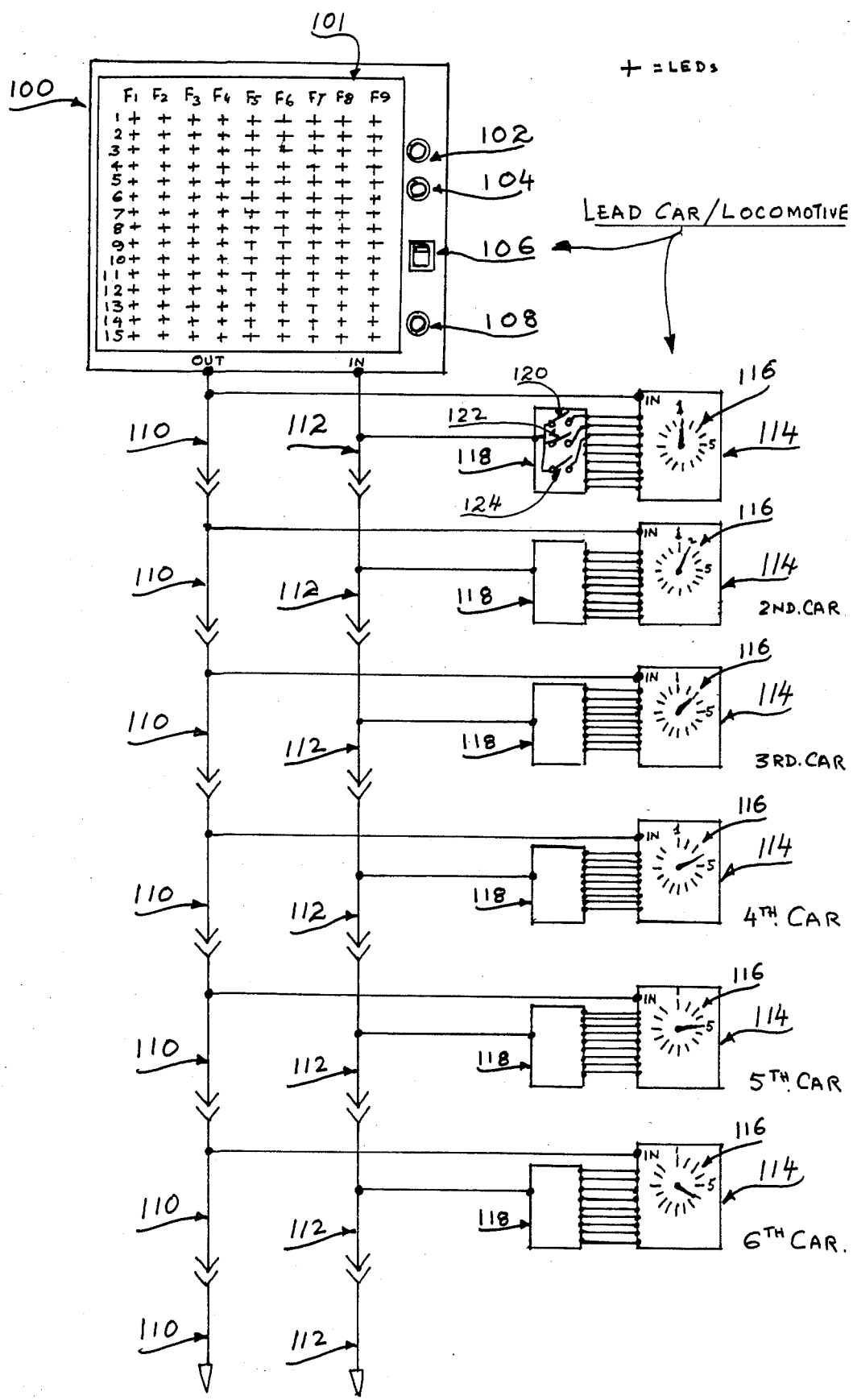
FIG. 1 is an overall system diagram of this invention.

Reference is now made to FIG. 1 which is an overall system diagram of the present invention. This system comprises the master unit 100, the car units 114s, the function relay assembly 118s, the trainline transmitting wire 110 and the trainline acknowledging wire 112. The master unit 110 is installed in the lead car or in the locomotive. The car unit 114 is installed one in each car. The function relay assembly 118 is installed one in each car. FIG. 1 represents a self propelled car train. In the locomotive powered train the car unit 114 and the function relay assembly 118 are not installed in the locomotive. The trainline transmitting wire 110 which runs through the whole length of the train is connected to the output of the master unit 100 and the inputs f the car units 114s of all the cars. The trainline acknowledging wire 112 which runs through the whole length of the train is connected to the input of the master unit 100 and the output of the function relay assembly 118 of all the cars. The nine outputs of the car unit 114 are connected to the inputs of the function relay assembly 118. Out of nine function relay contacts in the function relay assembly 118, only three contacts 120,122 and 124 of one function relay assembly are shown in this diagram. For clarity, out of fifteen cars only six cars are shown in this diagram. In normal operation of a car the function relay contacts 120,122,124 and the like remain in close positions. The master unit 100 is equipped with a display panel 101 which carries 15 rows and 9 columns of lights. Each row represents a car number and each column represents a particular function of the cars. An illuminated light on the display panel 101 indicates a fault condition. The type of fault and the car number is determined by the position of the illuminated light on column and row respectively. When a train is made up for service, the selector switches 116 of all the car units are placed in a sequential order. Counting the cars from one end of the train preferably from the front end, the selector switch 116 in the 1st. car is placed in position 1. In the 2nd. car, the selector switch 116 is placed in position 2 and in rest of the cars the selector switches 116s are placed in that order so that the car placement number matches the position of the selector switch of that car. All the lights on the display panel 101 of the master unit 100 are extinguished by the reset switch 102. By pushing and releasing the start switch 104 the master unit delivers one pulse about 25 millisecond wide to the inputs of all the car units 114s through the trainline transmitting wire 110. The car unit 114 of which the selector switch 116 is placed in position 1 responds to this 1st. pulse by delivering an acknowledging pulse about 25 millisecond wide to the input of the master unit 100 through the 1st. function relay contact 120. Immediately after receiving the acknowledging pulse from the 1st. car, the master unit 100 transmits the 2nd pulse to the inputs of all the car units. Now the 2nd. car of which the selector switch 116 is placed in position 2 responds by delivering an acknowledging pulse to the input of the master unit through the 1st. function relay contact 120 of the 2nd. car. The test continues in this manner up to the 15th. car. On the 16th. pulse from the master unit 100 the master unit and all the car units switch to 2nd. function mode. The 17th pulse (from the master unit 100) which is the 1st. pulse of the 2nd. function mode is responded by the 1st. car by delivering an acknowledging pulse through the 2nd. function relay contact 122 of the 1st. car. After receiving this acknowledging pulse the master unit delivers 2nd. pulse of the 2nd. function mode. Now the 2nd. car responds by delivering a pulse through the 2nd. function relay contact 122 of the 2nd. car. The test continues in the 2nd. function mode in this manner. On every 16th. pulse (of one function mode) from the master unit, the system switches to next function mode. The test continues in this manner up to the 9th. function mode. On the 16th. pulse of the 9th. function mode or the final function mode the system goes to a stop mode. After remaining for about 30 seconds in stop mode the system resets and starts automatically. Thus the system repeats this test after every 30 seconds.

If a fault occurs in any car the function relay contact of the corresponding faulty circuit opens up. This open function relay contact interrupts the acknowledging pulse from the car at fault. The master unit detects the missing acknowledging pulse, identifies the type of fault and the car number and illuminates the corresponding light on the display panel 101 of the master unit 100. During the stop mode the display panel 101 may be latched with the latching switch 106. The switch 108 is a lamp test switch.

The master unit and all the car units have their own independent and regulated 9 volt D.C. power sources not shown in this diagram. The negatives of all the power sources and the shields of the trainline wires are connected to car bodies.

Figure 2:
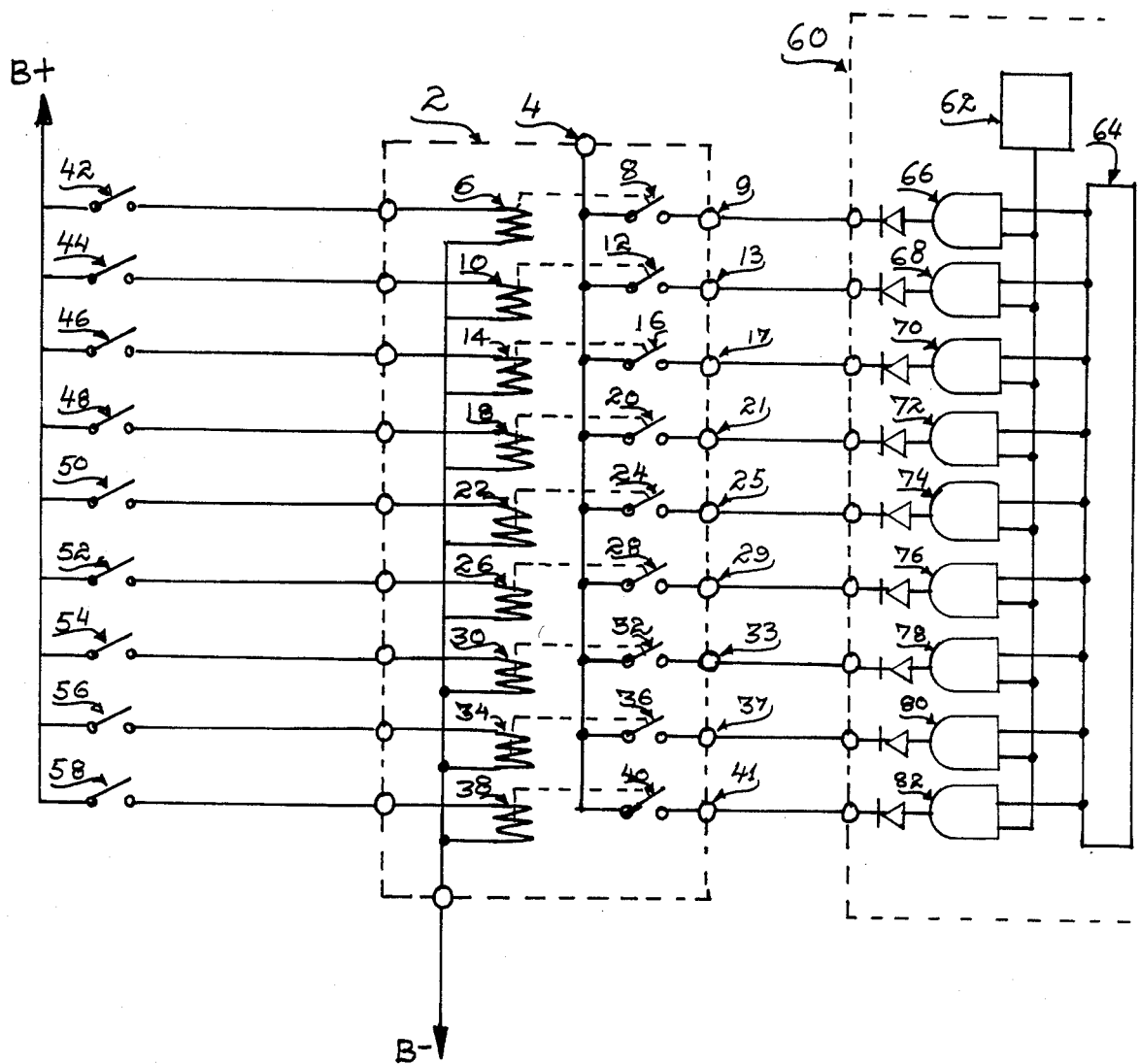
FIG. 2 is a circuit diagram of the function relay assembly and parts of interfacing circuit.

Reference is now made to FIG. 2 which is a circuit diagram of the function relay assembly and parts of interfacing circuit. The 9 inputs 261,262,263,264,265,266,267,268 and 269 of the function relay assembly 118 are connected to the outputs of the car units 114. The relay contacts 242 through 250 are the parts of existing electrical systems of a car. How many functions or which functions are to be monitored depend upon the requirements of the individual rail road. However, initially the following nine functions are chosen and their representing relay contacts 242 through 250 are interfaced with the function relay assembly 118. The output 260 of F.R.Assy. 118 is connected to the train line wire 112-FIG. 1.

(a) 1st. Accelerating Contactor 242.
(b) Motor Current Level Relay 243.
(c) 2nd. Accelerating Contactor 244.
(d) 3rd. Accelerating Contactor 245.
(e) Traction Motor Overload 246.
(f) Traction Motor Ground 247.
(g) Heating and Airconditioning 248.
(h) Door Close 249.
(i) Brake Applied 250.

Motor overload relay contact 246, motor ground relay contact 247, and Heating and Air conditioning relay contacts 248 remain in close position all the time until a fault occurs in their corresponding circuits. Remaining all other contacts open and close as they follow the command of the engineer. For example when the engineer dials for minimum power, the 1st. accelerating contactor 242 closes. As soon as current begins to flow through the traction motors, the current level relay contact 243 closes. Thus the relay coils 251 and 252 are energized and closing the contacts 120 and 122. In this condition the acknowledging pulses from the car unit 114 are able to pass through the contacts 120 and 122 during 1st. and 2nd. function mode respectively. Since the 2nd. and 3rd. accelerating contactor 244 and 245 respectively did not close, the function relay contacts 124 and 126 thus remained open. As a result of this, the acknowledging pulses from the car unit 114 during 3rd and 4th. function modes are interrupted. Thus the master unit illuminates the fault lights on column 3 and 4 of the master unit display panel 101 of FIG. 1. However, this indication is not considered as fault condition as no command was given for accelerating contactors 244 and 245. If the engineer dialed for full or maximum power and contactors 244 and 245 did not close would certainly mean a fault condition. The 1st, 2nd. and 3rd accelerating contactors are high voltage contactors. The contacts 242,244 and 245 are the auxiliary low voltage contacts operated by the mechanism of high voltage contactors.

The decoder 574 enables only one function gate during one function mode. The pulse generator 578 of the car unit 114 delivers only one pulse during one function mode.

Figure 3:
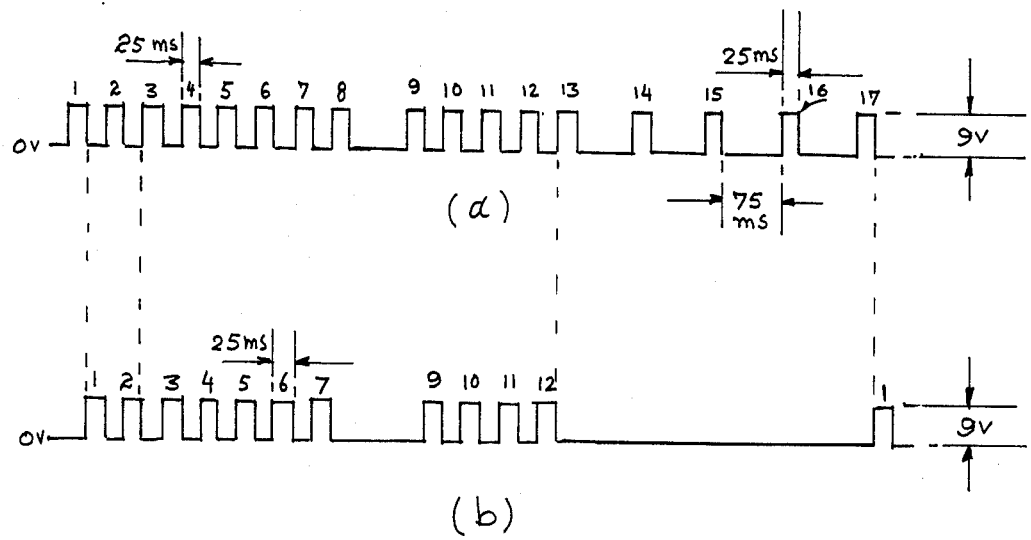

Reference is now made to FIG. 3. FIG. 3(a) and FIG. 3(b) are the ideal wave forms of the signal pulses transmitted and received respectively by the master unit during one function mode. FIG. 3 represents a train having 12 cars and the 8th. car has a fault condition in one function. The number shown above each pulse in FIG. 3(a) indicates the number of pulses transmitted by the master unit in one function mode. The number shown above each pulse in FIG. 3(b) indicates te car number which transmitted that particular pulse. When the 1st. pulse from the master unit that is pulse 1 in FIG.

3(a) goes from high to low, the 1st. car delivers the acknowledging pulse which is pulse 1 in FIG. 3(b). When the said acknowledging pulse goes from high to low, the master unit in the lead car delivers the 2nd. pulse which pulse 2 in FIG. 3(a). When the 2nd. pulse from the master unit goes from high to low, the 2nd car delivers the acknowledging pulse which is pulse 2 in FIG. 3(b). This continues up to the 8th. pulse from the master unit in the lead car, when the 8th. car fails to respond. After a delay of 50 millisecond the master unit in the lead car delivers the 9th. pulse which is responded by the 9th. car. The test continues up to the 12th. car. The 13th. pulse from the master unit in the lead car is not responded as there are no more cars on this train. The master unit in the lead car delivers 14th, 15th., 16th., and 17th, pulse at an interval of about 100 milliseconds. The 16th. pulse from the master unit switches the whole system into the next function mode. The 17th pulse which the 1st. pulse of the next function mode is responded by the 1st. car through its next function relay.

Referene is now made to FIG. 4. FIG. 4 is a schematic diagram of the master unit. All the integrated circuits used in this are of digital CMOS type. The monostable multivibrators 16,40, 42, 44, 46, 48 and 50, each represents one half of the I.C. CD4538. The counter 52 and 54, each represents one half of CD4250. The enable inputs of the said counters are used as clock input in order to advance the counters by the falling edge of the input pulses. The decoders 66, 68,70 and the like represents CD4514. The decoder 56 represents CD4028. The set reset flip flops 101,115, 201,215, 301,315 and the like, each of which represents one quarter of CD4043. For clarity, only two out of 15 flip flops and their corresponding LEDs per decoder shown in this diagram. For the said reason out of nine decoders only three decoders 66,68 and 70 are shown in this diagram. The reset switch 34 is used to reset the counters 52,54 and all the flip flops which extinguish the LEDs 401 through 615 and the like. At this point the output O of the decoder 56 keeps the follow input of the decoder 6 in high state thus enabling the data inputs of the decoder 66. The $\overline{Q}$ output of MMV 42 keeps the INH. inputs of all the decoders 66,68,70 and the like in high state, thus forcing the outputs of all the decoders 66, 68, 70 and the like to a low state. When the start switch 28 is depressed, the input of the main pulse generator 16 goes high. On releasing the start switch 28 the input of main pulse generator 16 goes from high to low which triggers an output pulse about 25 millisecond wide. The said pulse reaches the output terminal 26 through the AND gate 18, pulse sharpener 20 and 22, and the lamp test switch 24. The rising edge of the said pulse triggers the MMV 40 and 46 and drives their Q outputs high. The time constant of MMV 40 and 46 are 75 millisec. and 30 seconds respectively. The falling edge of the said pulse drives the counter 52 up by one count. The data outputs of the counter 52 enters the decoder 66. However, these datas in the decoder 66 have no effect on the output of the said decoder as the outputs are forced down to low state by the high INH. input. Immediately after the said pulse goes from high to low, an acknowledging pulse about 25 mill.sec. wide from the 1st. car arrives at the input terminal 2. This acknowledging pulse passes through a low pass filter formed by resistor 4 and capacitor 6, the pulse sharpener 10,12, the OR gate 14 & reaches the input of the main pulse generator 16. The resistor 8 acts as a pull down resistor. When the acknowledging pulse goes from high to low the main pulse generator 16 delivers the 2nd pulse which retriggers the MMV 40 and 46 and drives the counters 52 up by one count. The 2nd. car responds to the 2nd. pulse from the master unit by sending an acknowledging pulse. The test continues in this manner up to the 15th. car. If a car fail to respond during the test, the following steps take place in the master unit. For example it is assumed that the 15th. car failed to respond. Then, at this point the output of the counter 52 is IIII. Since no acnowledging pulse arrived at the input of the master unit after the master unit transmitted the 15th. pulse, the output of MMV 40 goes low 75 milliseconds after the MMV. 40 received the last pulse. The falling edge of the output of MMV. 40 triggers the MMV. 42. The $\overline{Q}$ output of MMV. 42 brings the INH. inputs of all the decoders 66,68,70 and the like to a low state for 250 microsecond. As the decoder 66 is enabled by the output O of the decoder 56, the data output of the counter 52 is IIII which is present in the decoder 66. When the INH. inputs of all the decoders 66,68,70 and the like goes low for 250 microseconds the 15th. output of the decoder 66 goes high for 250 microseconds and sets the flip flop 115 which turns on the LED. 415. When the $\overline{Q}$ output of MMV. 42 returns to high state after 250 microseconds, the rising edge of the said output triggers the MMV. 44. The Q output of MMV. 44 triggers the main pulse generator 16 which delivers the next pulse to the output terminal 26. On the 16th. pulse the output of the counter 52 becomes 0000 which drives the counter 54 up by one count. At this point the output of counter 54 is 0001 which makes the output 1 of the decoder 56 high, thus the decoder 68 is enables and the decoder 66 is disabled. After transmitting the 16th. pulse the master unit doesnn not receive an acknowledging pulse as this system is designed for a maximum of 15 cars. The 16th. pulse also trigged the MMV. 40. Since there was no acknowledging pulse for the 16th. pulse from the master unit, the $\overline{Q}$ output of MMV. 42 goes low for 250 microseconds. As the data inputs of all the decoders 66,68, 70 and the like are 0000 and the 0 outputs of the said decoders are not connected, the low INH. inputs at this point has no effect on the outputs of the said decoders. When the output of the MMV. 42 returns to high state, it triggers the MMV. 44 which delivers a pulse 250 microseconds wide to the input of the main pulse generator 16. The falling edge of the input triggers the main pulse generator which delivers the 17th. pulse which is the 1st. pulse of the 2nd. function mode. Now the 1st. car responds to this pulse by sending an acknowledging pulse through the 2nd. function relay of the 1st. car. The test continues in the 2nd. function mode up to the 15th. car. On every 16th. pulse from the pulse generator 16 the output of counter 52 becomes 0000, the counter 54 advances, the corresponding output of the decoder 56 becomes high which enables the corresponding decoders such as 66,68,70 and the like. On the 16th. pulse (from the main poulse generator 16) of the 9th. or the final function mode, the 9th. output of the decoder 56 becomes high which brings the output of the inverter 58 to a low state. The low output of the inverter 58 disables the AND gate 18 and thus the master unit goes to stop mode. After 75 milliseconds the output of MMV. 40 goes low which triggers MMV. 42. The rising edge of the $\overline{Q}$ output of MMV. 42 triggers MMV. 44 which in turn triggers main pulse generator. The output pulse from the main pulse generator 16 is interrupted by the disabled AND gate 18. After about 30 seconds the output of the MMV. 46 goes from high to low and triggers MMV. 48. The output of MMV. 48 goes high for 250 microseconds and resets all the flip flops and the counters 52 and 54. This makes the output 9 of the decoder 56 low which bring the output of the inverter 58 to high state, thus enabling the AND gate 18. When the reset pulse output of MMV. 48 goes from high to low, it triggers MMV. 50 to deliver a 250 microsecond wide pulse to trigger the main pulse generator 16. The output pulse from the main pulse generator 16 reaches the output terminal 26, triggers the MMV. 40 and 46 and drives the counter 52 up by one count. The said pulse is the 1st. pulse of the 1st. function mode. Opening the latch switch 64 during the stop mode prevents the master unit from automatic resetting. Opening the lamp test switch 24 simulates faults in all the functions of all the cars. Thus, all the indication lights are illuminated. The LED. 47, when it is on indicates the master unit is operational. X and Y output connected to FOL. and INH. inputs respectively of six decoders.

Reference is now made to FIG. 5 which is a schematic diagram of the car unit. The counters 568 and 570, each represents one half of CD4520. The decoder 572 represents CD4514. The decoder 574 represents CD4028. The MMVs 564,566 and 578, each of which represents one half of CD4538. The resistor 554 and capacitor 556 form a low pass filter. The schmitt trigger 560 and 562 act as pulse sharpener. The MMV. 564 and 566 form an automatic reset circuit. The MMV. 578 is the acknowledging pulse generator. When a pulse arrives at the input 352, after being filtered and sharpened, the said pulse reaches the inputs of the counter 568 and MMV. 564. The rising edge of the said pulse triggers the MMV. 564 and the Q output of the MMV. 564 goes high. The time constant of MMV. 564 is one second. The falling edge of the input pulse drives the counter 568 up by one count. The output of the decoder 572 changes with the output of the counter 568. At this point the output of the counter 568 is 0001 which makes the output 1 of decoder 572 high. As the selector switch 116 in position 1, the MMV. 578 is triggered by the said decoder output. The output pulse from the MMV. 578 is delivered to the output terminal 597 through 1st. function gate 579 and diode 588. The 1st. function gate 579 is enabled by the output 0 of the decoder 574. The next input pulse advances the counter 568 up by one count and that brings the counter output to 0010. At this point the output 2 of the decoder 572 goes high but it has no effect on the pulse generator 578 as the selector switch 116 is in position 1. The car unit of which the selector switch is in position 2 responds to this 2nd. pulse. On the 16th. input pulse the output of the counter 568 becomes 0000 and the output of the counter 570 becomes 0001. This makes the output 1 of the decoder 574 high which enables the 2nd. function gate 580. The next input pulse which is the 1st. pulse of the 2nd. function mode advances the counter 568 up by one count. At this point the output of the counter 568 becomes 0001. The output 1 of the decoder 572 goes high which triggers the pulse generator 578 through the selector switch 116 which is in position one. At this point the output pulse from the pulse generator 578 is delivered to the output terminal 598 through the 2nd. function gate 580 and diode 589. On every 16th. input pulse the counter 570 advances by one count, the output of the decoder 574 changes accordingly, thus the corresponding function gate is enabled. During one function mode only one function gate remains enabled. During one function mode only one pulse delivered by the pulse generator 578. A car unit generates an acknowledging pulse when the weighted output of the counter 568 equals the selected number of the selector switch 116. When the master unit goes to stop mode, no signal pulse arrives at the input terminal 552. The Q output of MMV. 564 goes low one second after it received the last pulse. The falling edge of the output of MMV. 564 triggers the MMV. 566 which delivers a reset pulse 250 microsecond wide and resets the counter 568 and 570. The output of both counters 568 and 570 becomes 0000. The output 0 of the decoder 574 goes high and enables 1st. function gate. The output 0 of the decoder 572 goes high but has no effect as this output is not connected. For clarity out of nine function gates only three are shown in this diagram. The output 9 of the decoder 24 is not connected.

The above description shall not be construed as limiting the ways in which this invention may be practiced but shall be inclusive of many other variations that do not depart from the broad interest and the intent of the invention.

Having thus described the invention, what is claimed is:

1. A monitoring system for monitoring faults of a plurality of functions in each rail road car of a train from the lead car comprising:

a digital electronic master unit located in said lead car for scanning each car in sequence from a first car of said train to a last car of said train to monitor one identical function in each car and repeating said scanning sequence for a next identical function until the plurality of functions are all scanned, by transmitting a sequence of electrical pulses one at a time and receiving electrical acknowledging pulses which represent the car and the function being monitored, said master unit comprising indicating means which indicates said car and said function being monitored in the absence of an acknowledging pulse being received by said master unit to indicate a fault condition;

first counting means for counting each said transmitting pulse in said scanning sequence, the instantaneous sum of said counted pulses determining which one of said cars is being monitored, and said counting means being reset when said instantaneous sum becomes greater than the maximum number of cars adaptable by said monitoring system;

second counting means for determining which identical function in each car in said scanning sequence is being monitored based upon the sum of the instantaneous count of said second counting means, said count of said second counting means being incremented to indicate a next identical function by said first counting means when said instantaneous sum of said first counting means becomes greater than the maximum number of cars adaptable by said monitoring system and said master unit switching to a stop mode by discontinuing the transmission of said transmitting pulses with the instantaneous sum of said second counting means becomes greater than the maximum number of functions provided in said monitoring system; decoder means for receiving said first and second counts for determining which car and which function is being monitored, said decoder means actuating said indicating means in the absence of an acknowledging pulse;

a respective digital car unit located in each rail road car for receiving said transmitting pulses from said master unit and returning an acknowledging pulse, each car unit have selector means set to a count different from the other selector means on other cars for transmitting an acknowledging pulse only when the count of a first counting means of said car unit corresponds with the selected count on said selector means and the said acknowledging pulse is transmitted through one of the channels selected by a second counting means of said car unit and said channel corresponds to one of the monitorable functions of a car;

a respective functional relay assembly located on each car for monitoring said plurality of functions on each car and transmitting or not transmitting said acknowledging pulses from said car unit depending upon whether the selected function being monitored has a fault condition;

means running the length of the train and connecting said master unit, said car unit and said functional relay assembly for transmitting said transmitting and acknowledging pulses.

2. A monitoring system according to claim 1, wherein said master unit comprising a means for resetting and starting said scanning sequence automatically by resetting said first and said second counting means and initializing said indicating means of said master unit and subsequently generating a transmitting pulse thereby initiating a start of next identical scanning sequence after remaining in said stop mode for a predetermined length of time.

3. A monitoring system according to claim 1, wherein said master unit comprising a latching means for freezing the information indicated by said indicating means during a nonscanning period by disabling said resetting means for said first and said second counting means.

4. A monitoring system according to claim 1, wherein said master unit comprising a means for testing the functional condition of said indicating means by simulating fault condition in all the cars of a train and in all the functions of each car wherein said simulation is accomplished by interrupting said transmitting pulses from said master unit.

5. A monitoring system according to claim 1, wherein said car unit comprising an automatic resetting means for resetting said first and said second counting means by delivering an electrical reset pulse to said first counting means and to said second counting means after a predetermined length of time from an instant the transmitting pulses from said master unit ceasing to arrive at the input of said car unit.

* * * * *